United States Patent
Das Sharma et al.

(10) Patent No.: US 9,779,053 B2
(45) Date of Patent: Oct. 3, 2017

(54) PHYSICAL INTERFACE FOR A SERIAL INTERCONNECT

(71) Applicant: Intel Corporation, Santa Clara, CA (US)

(72) Inventors: Debendra Das Sharma, Saratoga, CA (US); Daniel S. Froelich, Portland, OR (US); Venkatraman Iyer, Austin, TX (US); Michelle C. Jen, Sunnyvale, CA (US); Rahul R. Shah, Marlborough, MA (US); Eric M. Lee, Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 367 days.

(21) Appl. No.: 14/580,918

(22) Filed: Dec. 23, 2014

(65) Prior Publication Data
US 2016/0179710 A1   Jun. 23, 2016

(51) Int. Cl.
*G06F 13/38* (2006.01)
*G06F 13/40* (2006.01)
*G06F 13/42* (2006.01)
*G06F 13/16* (2006.01)

(52) U.S. Cl.
CPC ........ *G06F 13/4068* (2013.01); *G06F 13/385* (2013.01); *G06F 13/4282* (2013.01); *G06F 13/1642* (2013.01); *G06F 13/1673* (2013.01)

(58) Field of Classification Search
CPC ........ G06F 13/38; G06F 13/385; G06F 13/40; G06F 13/4063; G06F 13/4068; G06F 13/4072; G06F 13/42; G06F 13/4265; G06F 13/4282
See application file for complete search history.

(56) References Cited

U.S. PATENT DOCUMENTS

| 8,638,838 B1 * | 1/2014 | Betts | H04L 5/16 326/30 |
| 8,782,321 B2 * | 7/2014 | Harriman | G06F 13/4022 370/466 |
| 2006/0106911 A1 * | 5/2006 | Chapple | G06F 13/385 709/200 |

(Continued)

FOREIGN PATENT DOCUMENTS

CN   104539579 A   *   4/2015

OTHER PUBLICATIONS

Intel Corporation, "An Introduction to the Intel QuickPath Interconnect," Jan. 30, 2009, pp. 1-22.

(Continued)

*Primary Examiner* — Thomas J Cleary
(74) *Attorney, Agent, or Firm* — International IP Law Group, P.L.L.C.

(57) ABSTRACT

An apparatus that includes a physical interface for a serial interconnect is provided. The physical interface includes a buffer that is selectable to function as a drift buffer or an elastic buffer by a voltage level on a buffer control line. The physical interface also includes encoding logic that can be enabled or disabled by a voltage level on a logic control line. Further, the physical interface also includes and an ordered set generator that can be enabled or disabled by a voltage level on a communications control line.

25 Claims, 11 Drawing Sheets

(56) References Cited

U.S. PATENT DOCUMENTS

| | | | | |
|---|---|---|---|---|
| 2010/0014541 | A1* | 1/2010 | Harriman | H04L 69/28 370/458 |
| 2012/0079156 | A1* | 3/2012 | Safranek | G06F 12/0835 710/305 |
| 2014/0047288 | A1* | 2/2014 | Lee | G11C 11/4093 714/719 |
| 2014/0181319 | A1* | 6/2014 | Chen | H04L 47/33 709/234 |
| 2016/0077994 | A1* | 3/2016 | Hamada | G06F 13/4022 710/313 |

OTHER PUBLICATIONS

Intel Corporation, "PHY Interface for the PCI Express, SATA, and USB 3.0 Architectures, version 4.0", 2007, version 4.0, pp. 1-81.
Intel Corporation, "PHY Interface for the PCI Express* Architecture: PCI Express 3.0", 2007, Revision 9, pp. 1-53.

* cited by examiner

200

800

900

1100

1

PHYSICAL INTERFACE FOR A SERIAL INTERCONNECT

FIELD

This disclosure pertains to computing system, and in particular (but not exclusively) to a physical interface for serial communications in computing systems.

BACKGROUND

As computing systems are advancing, the components therein are becoming more complex. As a result, the interconnect architecture to couple and communicate between the components is also increasing in complexity to ensure bandwidth and latency requirements are met for optimal component operation. Furthermore, different market segments need different interconnect architectures to suit the market's needs. For example, servers require higher performance, while the mobile ecosystem is sometimes able to sacrifice overall performance for power savings.

High speed serial interconnect links are used for in system communications between processors, disks, external interfaces, and numerous other units. These links may need to be coherent, e.g., ensuring identical memory contents in different locations. The serial interconnect links can include links between processor cores on a single die, for example, an intra-device interconnect (IDI). This provides a high-speed, low latency connection, but is not generally suitable for longer connection lengths.

Communications between chips that may be located on a single board or backplane may use a more suitable interconnection, such as the quick-path interconnect (QPI) from Intel, the ultra-path interconnect (UPI) from Intel, or similar protocols. These interconnections may be more complex than IDI, but provide fast communications between proximate devices. The proximate location of the devices for the IDI and QPI allow a shared clock signal, which can lower complexity and latency, and allow hardware synchronization, for example, through a drift buffer.

Longer distance communications, for example, across multiple boards or even cables between device cabinets, may use the peripheral component interconnect express (PCIe) protocol, which provides stable communications, and allows the use of extension devices. This communications protocol does not use a shared clock signal, but uses a protocol mechanism to compensate for the timing differences that may be present. This allows synchronization of data through a buffer termed an elastic buffer. Further, the PCIe standard uses an error encoding technique that allows the recognition and correction of errors, such as 8b/10b or 128b/130b. These encoding techniques increase the accuracy of the transmission, but increase latency and decrease total throughput.

Integrated circuits often have the protocol stacks for these communications designed into the chip itself. There may be a certain number of each type of interconnect protocol on each chip. However, the chips may not include a sufficient number of one of the types of interface, which may lead to expensive redesigns prior to fabrication.

DETAILED DESCRIPTION

Figure 1:
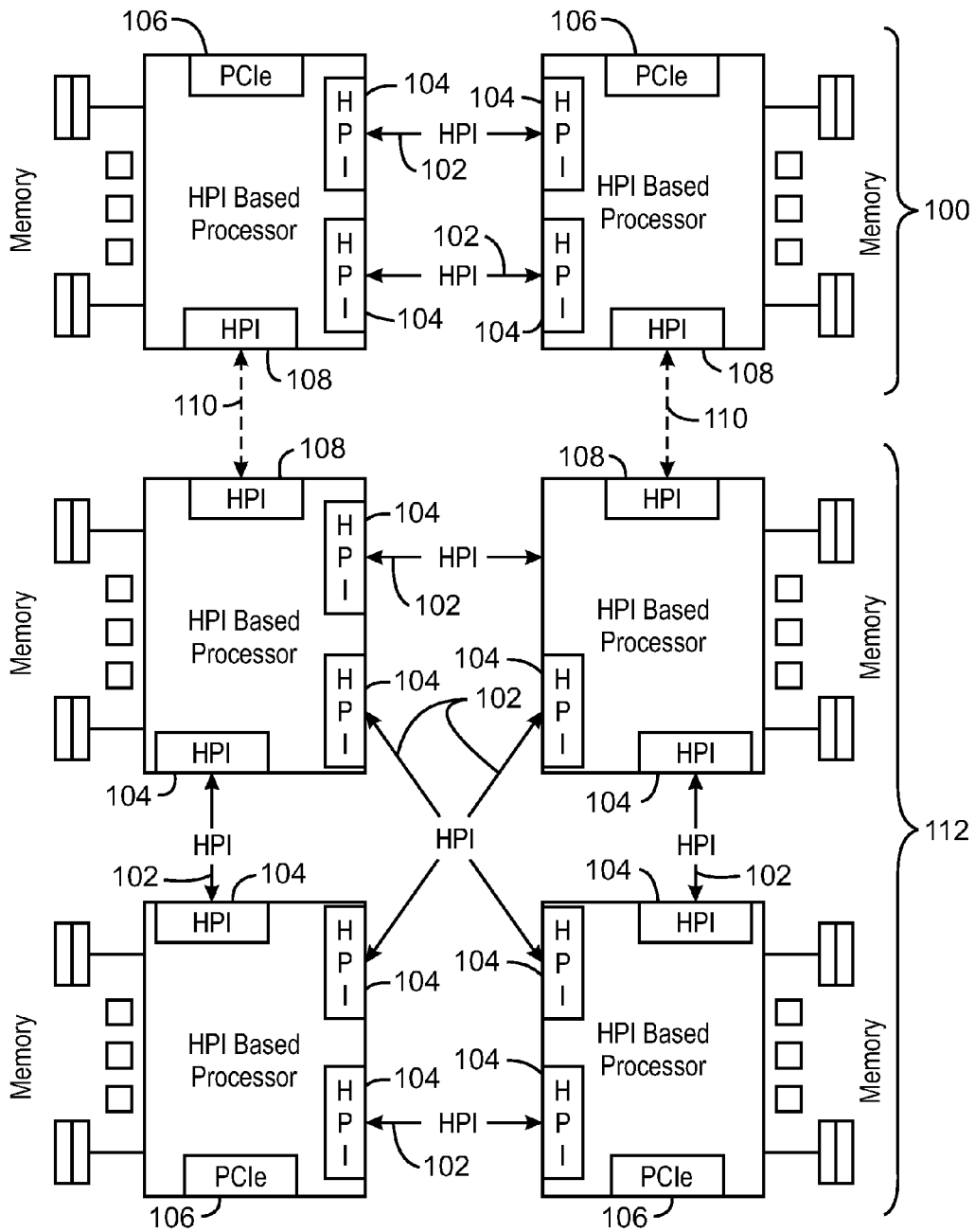
FIG. 1 illustrates an embodiment of a multi-chip configuration.

The electrical characteristics of various interconnect protocols have converged, allowing the analog circuit design as well as electrical validation methodologies to be used across multiple protocols, such as the peripheral component interconnect express (PCIe) and high performance interconnects (HPI), such as quick path interconnect (QPI) and ultra-path interconnect (UPI). However, differences exist between the logical operations of the protocols, such as the width, encoding, power states, data rates, and the like. The lack of convergence at the logical levels has precluded designers of various units that use HPIs, such as node controllers, accelerators, or field-programmable gate arrays (FPGAs), among others, from using industry standard physical interface designs, for example, the physical interface for PCIe (PIPE) from Intel Corporation.

Embodiments described herein provide a physical interface (PI) for a high-speed serial, point-to-point interconnect that allows the physical interface to be used in different types of protocol stacks without modification. For example, the physical interface may be used in a protocol stack for an HPI, or in a longer distance communications protocol, such as PCIe. Further, the high-speed serial, point-to-point interconnect may be coherent or non-coherent, depending on the type of application.

The physical interface includes architectural features consistent with HPI, including, for example, a buffer that can function as a drift buffer. Further, the physical interface may allow fine-grained bandwidth scaling through incremental frequency changes, width bumps, low latency for normal operation as well as entry and exit from low-power states, among others. The physical interface also includes architectural features that are consistent with PCIe, such as a buffer that can function as an elastic buffer, encoding circuitry, and an ordered set (OS) generator that can control point-to-point communications with another PCIe interface, among others. For example, the OS generator may generate control messages such as a TS1, a TS2, an SKP, an EIEOS, and an SDS message, among others.

As described in examples herein, the physical interface may be part of the physical interface to PCIe (PIPE) specification from Intel that includes associated sub-layers, such as a PCS (Physical Coding Sub-Layer), a PMA (Physical Media Attachment), and a MAC (Media Access Control) layers. However, the techniques are not limited to PIPE or the precise structures shown. Accordingly, the techniques may be used in any logical blocks that may be used to perform as a physical interface for either an HPI or a PCIe protocol stack, without substantial circuit modification.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to interconnect communications in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from a multi-protocol physical interface. For example, the disclosed embodiments are not limited to servers, but may also be used in cloud computing networks, networked computers, desktop computer systems, or portable computer systems. Embodiments may be used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below.

FIG. 1 illustrates an embodiment of a multi-chip configuration. A two-chip configuration 100, as depicted, includes two HPI links 102. As described herein, each chip may be a separate integrated circuit package that includes a processor, a multi-core processor, an FPGA, a graphics processing unit (GPU), or any number of other devices. The HPI links 102 may be provided by HPI protocol stacks 104 that are integrated into each of the chips. Although two HPI links 102 are shown, in other implementations, one HPI link 102 may be utilized. For larger topologies, any configuration may be utilized as long as an ID is assignable and there is some form of virtual path.

As shown, the chips may also include PCIe protocol stacks 106 that may be useful communicating with other devices. However, in larger multi-processor implementations, such as servers, the PCIe protocol stacks 106 may not be as useful. In these implementations, it may be useful to replace at least a portion of the PCIe protocol stacks 106 with additional HPI protocol stacks 108 to allow additional HPI links 110 to other chips. In this example, the additional HPI links 110 are used to couple the two chip configuration 100 to a four chip mesh 112.

As shown, the four chip mesh 112 has an HPI link 102 from each chip to another. However, the two chip implementation 100 is only coupled through two additional HPI links 110, and, thus, not every chip is directly connected to each other through an HPI link 102 or 110. However, if a virtual path exists between the chips, the configuration is supported. A range of supported chips includes 2-32 in a native domain. Higher number of processors may be reached through use of multiple domains or other interconnects between node controllers.

The architecture of the HPI protocol stacks 104 and 108 is similar to PCIe in that it also includes a layered protocol architecture. As discussed herein, HPI defines protocol layers (coherent, non-coherent, and optionally other memory based protocols), a routing layer, a link layer, and a physical layer. Furthermore, as many other interconnect architecture's HPI includes enhancements related to power managers, design for test and debug (DFT), fault handling, registers, security, etc.

In addition to HPI links, in various embodiments, an internal or in-die interconnect (IDI) may be provided to enable communication between various IP logic blocks located on a single semiconductor die of a semiconductor device. The IDI may be configured to enable such communication even where the different logic blocks operate at different voltage and frequency domains. As will be described further below, various mechanisms may enable communication between disparate domains. More particularly, the IDI may couple one or more logic blocks, such as an HPI protocol stack 104 or 108 or a PCIe protocol stack 106, to a system interface of the semiconductor device. In turn, this system interface may communicate with various off-chip entities, such as a system memory (e.g., dynamic random access memory (DRAM)), input/output devices or the like. As examples of logic blocks, embodiments may include one or more processing cores, graphics or media processing units (GPUs, MPUs), fixed function units such as a physics processing unit or other such blocks.

Communication along the IDI may be according to a given communication protocol such as a cache coherent communication protocol. Such a protocol may enable cache coherent communication between the various logic blocks and an on-die shared cache, such as a last level cache (LLC) coupled to the IDI. In some implementations, the IDI may include various communication layers such as a protocol layer, which is a highest layer of an interconnection hierarchy and sets a format for message transmission, and a link layer, which receives transmission packets from the protocol layer and handles communication using flow control, encoding and error checking techniques, as will be described further below. There may also be multiple virtual or physical channels as needed for deadlock free protocols. Note that the link layer may be skew tolerant of differences in the frequency or voltage at which the different components operate.

Figure 2:
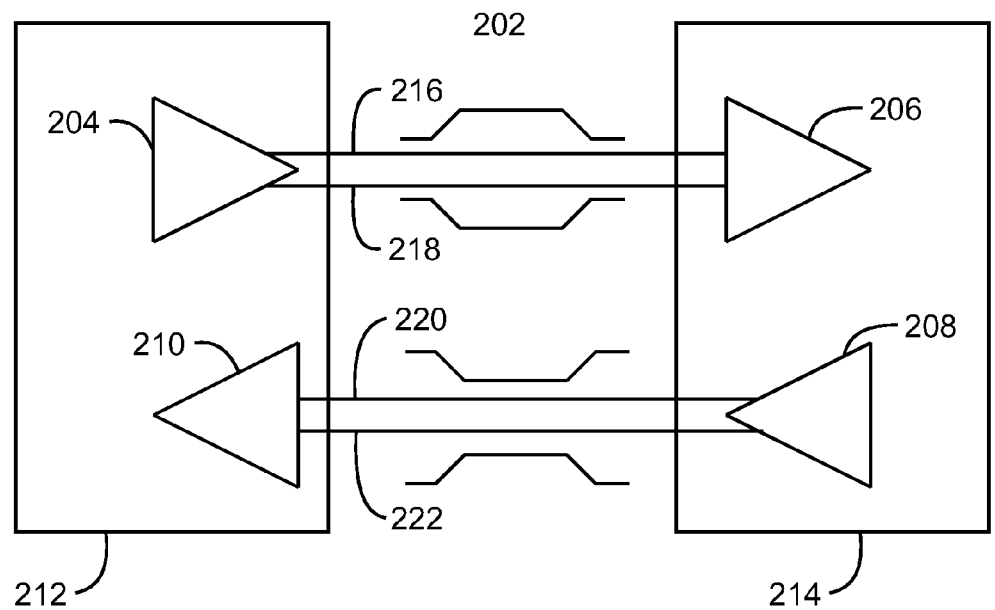
FIG. 2 illustrates an embodiment of a transmitter and receiver pair for a high-speed serial interconnect.

FIG. 2 illustrates an embodiment of a transmitter and receiver pair for a high-speed serial interconnect 200. The serial interconnect 200 may be an HPI compliant link, a PCIe compliant link, or other similar serial interconnect. A connection between two devices, such as the first device 212 and the second device 214, is referred to as a link 202. In the embodiment shown, a basic 202 link includes two, low-voltage, differentially driven signal pairs: a transmit pair 204/206 and a receive pair 208/210. Accordingly, a first device 212 includes transmission logic 204 to transmit data to a second device 214 and receiving logic 210 to receive data from the second device 214. In other words, two transmitting paths, e.g., paths 216 and 218, and two receiving paths, e.g., paths 220 and 222, are included in a link 202. As used herein, the terms transmitting path and receiving path refer to any path for transmitting data, such as a transmission line, a copper line, an optical line, a wireless communication channel, an infrared communication link, or other communication path.

The link 202 in FIG. 2 is considered a single lane, but multiple lanes may be present, wherein each lane is a set of differential signal pairs, e.g., one pair for transmission and one pair for reception. To scale bandwidth, a link may aggregate multiple lanes denoted by xN, where N is any supported number of lanes, such as 1, 2, 4, 8, 12, 16, 32, 64, or greater.

A differential pair refers to two transmission paths, such as lines 216 and 218, used to transmit differential signals. As an example, when line 216 toggles from a low voltage level to a high voltage level, i.e. a rising edge, line 218 drives from a high logic level to a low logic level, i.e. a falling edge. Differential signals may provide better electrical characteristics, such as better signal integrity, for example, with respect to cross-coupling, voltage overshoot/undershoot, ringing, etc. This allows for a better timing window, which enables faster transmission frequencies.

In embodiments described herein, the transmission logic 204 and 208 and the receiving logic 206 and 210 can include a physical interface (PI) that may be used in multiple types of protocol stacks without redesign. For example, the physical interface may be used in a PCIe compliant protocol stack or in an HPI protocol stack. Although the other circuits of the protocol stack will differ, the physical interface will remain the same, simplifying the design process. As used herein, this may be termed a multi-protocol physical interface, and may include logic blocks in different layers of a protocol stack, such as the link layer and the physical layer.

Figure 3A:
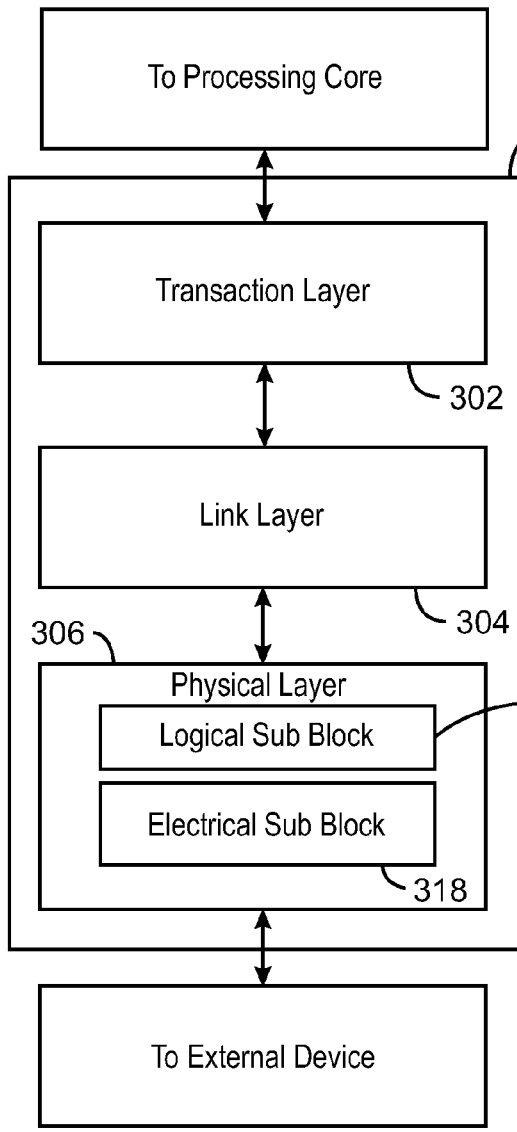
FIGS. 3A and 3B illustrate an embodiment of a layered stack protocol stack.
Figure 3B:
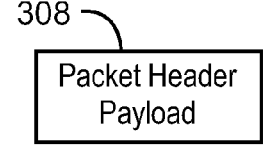

FIGS. 3A and 3B illustrate an embodiment of a layered stack protocol stack 300. The layered protocol stack 300 may include any form of a layered communication stack, such as a HPI stack, a PCIe stack, an IDI stack, or other layered stack. Although the discussions herein are related to a PCIe stack, the same concepts may be applied to other interconnect stacks. In one embodiment, protocol stack 300 is a PCIe protocol stack including transaction layer 302, link layer 304, and physical layer (PHY) 306. An interface, such protocol stacks 104, 106, and 108 in FIG. 1, may be represented as a communication protocol stack 300. A communication protocol stack 300 may also be referred to as a module or interface that implements or includes a protocol stack.

PCI Express uses packets to communicate information between components. Packets are formed in the transaction layer 302 and data link layer 304 to carry the information from the transmitting component to the receiving component. As the transmitted packets flow through the other layers, they are extended with additional information necessary to handle packets at those layers. At the receiving side the reverse process occurs and packets get transformed from their PHY 306 representation to the data link layer 304 representation and finally, for transaction layer packets, to the form that can be processed by the transaction layer 302 of the receiving device.

In one embodiment, the transaction layer 302 is to provide an interface between a device's processing core and the interconnect architecture, such as data link layer 304 and PHY 306. In this regard, a primary responsibility of the transaction layer 302 is the assembly and disassembly of packets, i.e., transaction layer packets (TLPs). PCIe implements split transactions, e.g., transactions with request and response separated by time, allowing a link to carry other traffic while the target device gathers data for the response.

In addition PCIe utilizes credit-based flow control. The translation layer 302 typically manages credit-based flow control for TLPs. In this scheme, a device advertises an initial amount of credit for each of the receive buffers in transaction layer 302. An external device at the opposite end of the link, such as a controller hub or other device, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (simply messages) are defined to support in-band communication between PCIe agents.

Therefore, in one embodiment, transaction layer 302 assembles packet header/payload 308. Format for current packet headers/payloads may be found in the PCIe specification at the PCIe specification website.

The data link layer 304, also referred to as a link layer 304, acts as an intermediate stage between transaction layer 302 and the PHY 306. In one embodiment, a responsibility of the data link layer 304 is providing a reliable mechanism for exchanging transaction layer packets (TLPs) between two components in a link. One side of the data link layer 304 accepts TLPs assembled by the transaction layer 302, and appends a packet sequence identifier 310 to the packet header/payload 308, i.e. an identification number or packet number. The data link layer 304 then calculates and appends an error detection code, e.g., CRC 312, to the packet header/payload 308. The data link layer 304 submits the modified TLPs to the PHY 306 for transmission across a physical to an external device.

In one embodiment, the PHY 306 includes a logical sub block 314 and an electrical sub-block 316 to physically transmit a packet to an external device. The logical sub-block 314 is responsible for the logical functions of the PHY 306.

In embodiments described herein, the logical sub-block 314 includes a buffer that may function either as a drift buffer or an elastic buffer. Further, the logical sub-block 314 includes a data encoding section that can be disabled by a control signal. The data encoding section can encode data using a 128b/130b transmission code, where 130-bit symbols are transmitted/received. Here, special symbols are used to frame a packet with frames 316. In addition, in one example, the receiver also provides a symbol clock recovered from the incoming serial stream. The logical sub-block 314 also include circuitry that can generate Order Packets (OS) that can be used to control a PCIe protocol interface.

The OS generator may also be enabled or disabled by a control signal. In this regard, the logical sub-block 314 includes a transmit section to prepare outgoing information for transmission by electrical sub-block 318, and a receiver section to identify and prepare received information before passing it to the Link Layer 310. In the embodiment shown in FIG. 3, the logical sub-block 314 is using the buffer as an elastic buffer under software control. Further, the data encoding section and OS generator are both enabled.

The electrical sub-block 318 includes a transmitter and a receiver. The transmitter is supplied by logical sub-block 314 with symbols, which the transmitter serializes and transmits on to an external device. The receiver is supplied with serialized symbols from the external device and transforms the received signals into a bit-stream. The bit-stream is de-serialized by the electrical sub-block 318 and supplied to the logical sub-block 314.

As stated above, although transaction layer 302, link layer 310, and PHY 306 are discussed in reference to a specific embodiment of a PCIe protocol stack, in an embodiment the PHY 306 can be used with an HPI protocol, for example, by setting control voltages described herein to fixed values. In fact, any layered protocol may be included. As an example, a port or interface that is represented as a layered protocol may include first layer to assemble packets, such as a transaction layer 302. A second layer may sequence packets, such as a link layer 304. A third layer may transmit the packets, such as a PHY 306. In embodiments described herein, the transaction layer 302 and the link layer 304 may be changed to fit a specific protocol, while the PHY 306 can be used with a number of different protocols.

Figure 4:
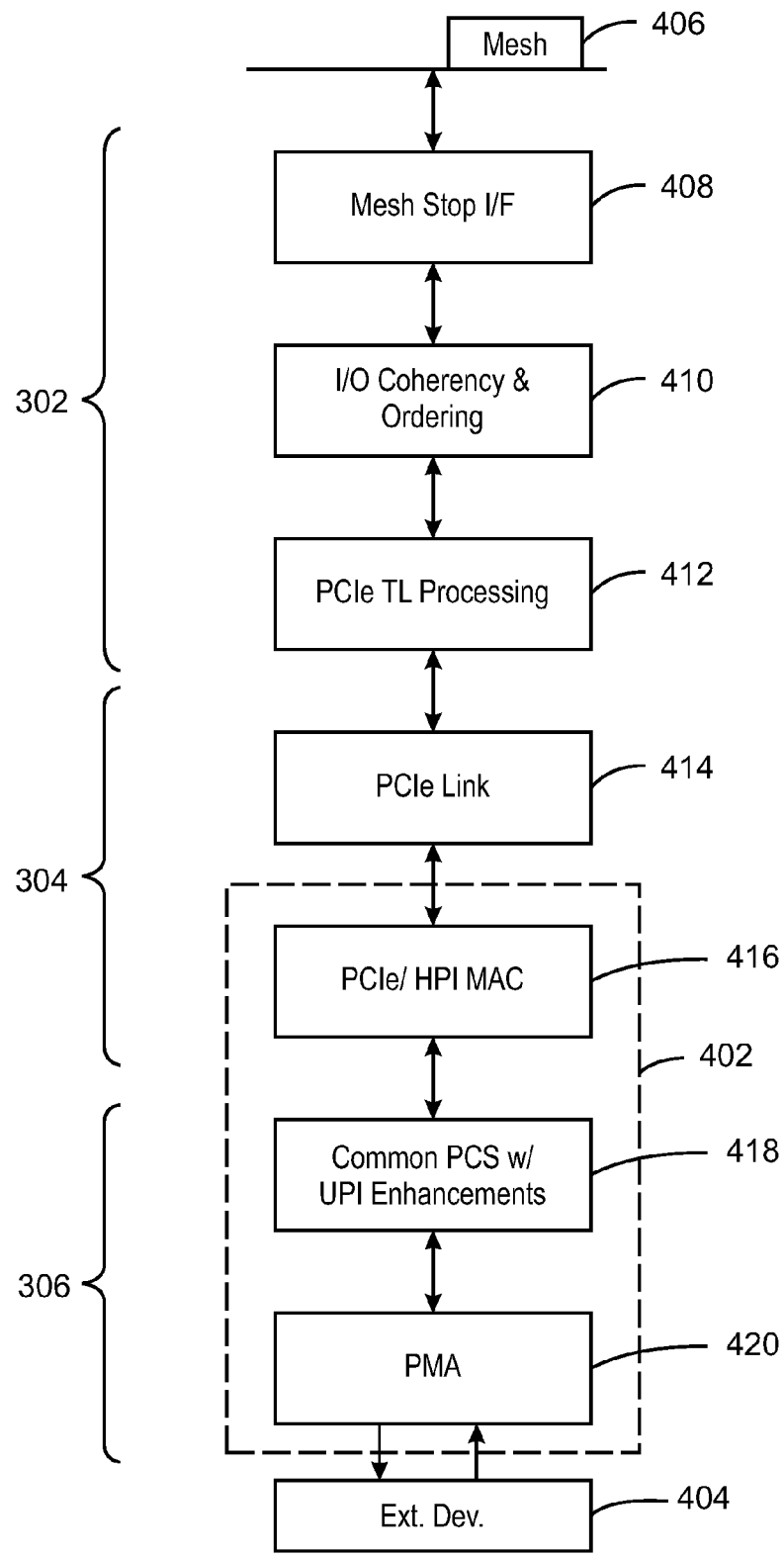
FIG. 4 illustrates a more detailed view of a PCIe protocol stack including a multi-protocol physical interface.

FIG. 4 illustrates a more detailed view of a PCIe protocol stack 400 including a multi-protocol physical interface 402. Like numbered items are as described with respect to FIGS. 3A and 3B. The PCIe protocol stack 402 couples a PCIe protocol stack in an external device 404 to a mesh 406. The mesh 406 may be, for example, a network of processor cores. The multi-protocol physical interface (PI) 402 may be used in embodiments to support both PCIe protocol stacks and HPI protocol stack.

The first layer of the PCIe protocol stack 400 is a transaction layer 302. Generally, communications in the mesh 406 are close to the capacity of the mesh 406, accordingly, the transaction layer 302 may include a mesh stop interface 408 to function as a temporary buffer for communications entering and leaving the mesh 406. An input/output (I/O) coherency and ordering block 410 may be included in the transaction layer 302 to ensure that memory contents at each end of the link contain the same contents. Further, the I/O coherency and ordering block 410 may assemble the packets into the appropriate order based on header information in each packet. A PCIe transaction level (TL) processing block 412 may assemble (or disassemble) packets by appending headers, for example, to identify packet order.

A second layer of the PCIe protocol stack 400 is a link layer 304. The link layer may include a PCIe link block 414 that may append an error correction code to the packets, for example, by calculating a cyclic redundancy code (CRC) and appending it to the packets. In one embodiment, a combined PCIe/HPI MAC block 416 handles various communications mechanisms such as PCIe lane shutdown, the link training and steady state machine (LTSSM), and other logical functions for the PCIe communications. For example, the PCIe/HPI MAC block 416 controls the Dynamic Link Width as part of L1.

It can be noted that the PCIe/HPI MAC block 416 is not needed in all embodiments. Further blocks, such as the common PCS 418 with HPI enhancements may be used in embodiments that have a stack specific PCIe MAC or HPI MAC, for example, by pulling the control lines to fixed voltages.

The PHY 306 includes a common PCS (physical coding sub-block) block 418, with HPI compatible extensions. For example, the common PCS block 418 includes a buffer that can function as either a drift buffer or an elastic buffer using an input to the PCS layer from the MAC layer to select between the two modes. For the PCIe embodiment, the buffer would be operated as an elastic buffer, for example, under software control. The common PCS block may also include an encoding/decoding circuitry that, when activated, would encode data traffic using a PCIe format code, such as 8b/10b or 128b/130b.

The common PCS block also includes the ordered set (OS) logic that, when enabled, would generate/receive OS packets for control of the PCIe traffic or any Link that needs different clock crystals between the two Link partners. These control settings allow the PCIe traffic to move to distant units that may not share a clock, for example, over extension devices (often termed retimers). The use of the PCIe codes and the OS is enabled for use during PCIe communications and, in one embodiment described herein, during HPI communications.

The PHY 306 also includes a physical media access (PMA) block 420 that communicates the data to another PMA block in an external device 404, for example, over a PCIe link. The PMA block 420 may be common between the different types of protocol stacks.

Figure 5:
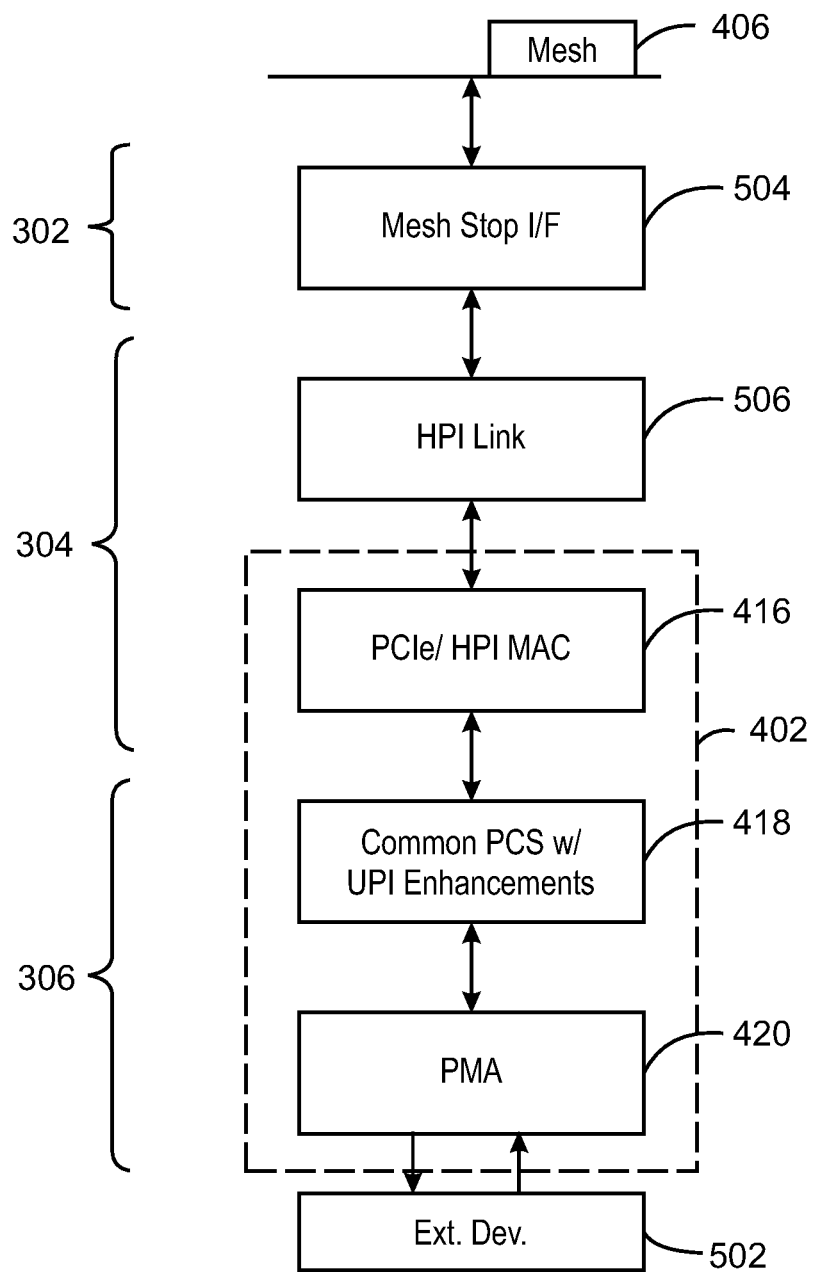
FIG. 5 illustrates an HPI protocol stack including the multi-protocol physical interface.

FIG. 5 illustrates an HPI protocol stack 500 including the multi-protocol physical interface 402. Like numbered items are as discussed with respect to FIGS. 3A, 3B, and 4. In one embodiment, the multi-protocol physical interface 402 described herein may also be used in the HPI protocol stack 500 to communicate with an external device 502 without further modification.

The HPI protocol stack 500 includes a transaction layer 302. The shorter distances for the HPI protocol communications allow for less complexity of the transactions. Accordingly, for HPI communications, the transaction layer 302 may be simpler than that used for PCIe, including only a mesh stop interface 504. As for the mesh stop interface 408 described with respect to FIG. 4, this buffers traffic to and from the mesh 406. However, the HPI protocol stack 500 is not limited to this configuration. For example, the HPI protocol may use an I/O coherency and ordering block and a transaction block, similar to that described for blocks 410 and 412, respectively, of FIG. 4.

In FIG. 5, the transaction layer 302 an HPI link 506, and the PCIe/HPI MAC 416 described above. Like numbered items are as discussed with respect to FIGS. 3 and 4. While FIGS. 4 and 5 show the common PCIe/HPI MAC 416 used for the PCIe protocol stack and the HPI protocol stack, respectively, it is not needed for all cases. In one embodiments, a standard HPI MAC may be interfaced to a PHY 306 that is designed as described herein. In this embodiment, the drift buffer is operated in elastic buffer mode, the appropriate frequency target is used, the OS generator is bypassed, and the 8b/10b or 128/130b encoder is bypassed.

The multi-protocol physical interface 402 described herein has a number of functional elements to adapt to either a PCIe protocol stack or an HPI protocol stack. For example, since the physical interface is on a single lane level, it is width-agnostic. As a result, any number of lanes can be used to aggregate to form a link.

Further, the multi-protocol physical interface 402 has appropriate bandwidth scaling for either protocol. HPI may have smaller increments between the frequencies as the frequency is increased between generations of processors. Further, the frequency may be modulated based on the silicon and channel health. For the HPI protocol stack additional encoding may be used for the various speeds supported by HPI, which the analog circuitry can use. In addition to this, supporting additional speeds between 8 GT/s (gigatransfers per second) and 16 GT/s, for example, as used in PCIe 4.0, does not place a significant additional burden on the design for the multi-protocol physical interface 402.

The communication mechanism differs between the protocols. HPI uses fixed width packets termed flits, for example, 192 bits wide, for communication as opposed to the variable packet size in PCIe. It should be noted that since both protocols use the same scrambling and since there is no OS sent in the HPI mode, suppressing the encoding and decoding makes it possible for the PCS layer to pass the flits through.

The control of power states may also differ. For example, the HPI protocol makes extensive use of the L0p state, in which a portion of the lanes are shut down. The L0p state does not exist in the PCIe protocol. In some embodiments, the common PCIe/HPI MAC 416 will include circuitry to use the existing L0s mechanism on the selected lanes that are going idle in HPI. The L0c handshake is used for power state transition, as it does in the HPI protocol. This support is accomplished purely at the controller level, without involving design elements in the physical interface 402.

The startup sequences, such as initialization and the link-training LTSSM, are similar for the PCIe protocol and the HPI protocol. Ordered Set differences in the training is disambiguated by the PCS through an input that distinguishes between HPI and PCIe, e.g., by shutting off the OS generator.

In one embodiment, the HPI protocol may be enhanced to allow transmission across longer distances, such as across cable between enclosures with different power planes and clock crystals. This may be performed by enabling the 128b/130b encoding and OS generation. It can be noted that in the ordered sets, the flits get transmitted in the "Data Blocks" and the ordered sets get transmitted within the "Ordered Set Blocks" similar to PCIe. This operation will introduce additional latency, but this should be acceptable given that the additional latency is only incurred only when there is a ppm difference in the clock frequencies. Further, this will allow the use of extension devices, or retimers, in HPI or other protocol that are to tunnel over the PCIe protocol.

Figure 6:
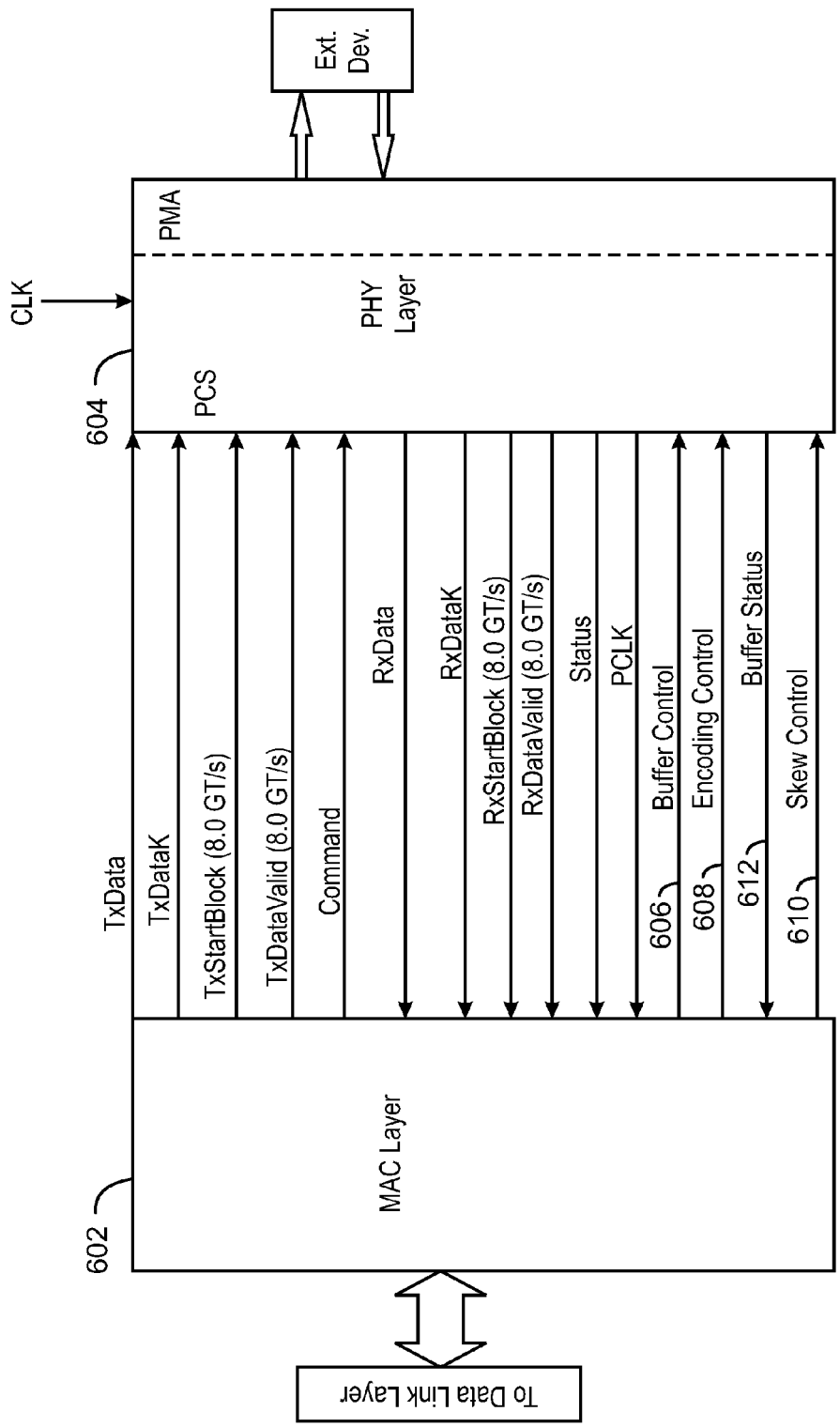
FIG. 6 illustrates communications lines in the multi-protocol physical interface between a media access control (MAC) sub-layer and a physical coding sub-layer (PCS).

FIG. 6 illustrates communications lines in the multi-protocol physical interface 600 between a media access control (MAC) sub-layer 602 and a physical coding sub-layer (PCS) 604. The HPI protocol supports a common clock and has tighter skew requirements between lanes to decrease latency. In contrast, the PCIe protocol supports ppm differences (parts-per-million differences in frequency) between the two ends of a link to support different form factors, including cables where the two ends can be coupled to equipment in different enclosures with different power planes. The multi-protocol physical interface 600 adds two inputs, e.g., as control lines, from the MAC sub-layer 602 to the PCS 604. A buffer control line 606 uses a voltage setting to instruct the PCS 604 to use a buffer as a drift buffer instead of an elastic buffer. The use of the buffer as a drift buffer eliminates about 4-5 stages involved in the notification through synchronizers in the elastic buffer, as it simply pulls an entry every cycle keeping the desired Rd-Wr pointer separation, e.g., by adding one to the read pointer at each cycle.

An encoding control line 608 uses a voltage setting to enable or suppress the 128b/130b (or 8b/10b) encoding/decoding and the generation of the Ordered Sets (OS). In one embodiment, the encoding line 608 may be divided into separate lines for individual control over the encoding and the OS generator. As described herein, the same buffer may be used for storage in both the elastic buffer as well as drift buffer modes with separate control circuitry for both for ease of implementation. It is possible to further have common flops and gates between the two control circuitry as described with respect to FIGS. 7, 8, and 9. The Ordered Set generation/receipt mechanism is also bypassed in the HPI mode to save on both latency and bandwidth. When the is disabled, this disables related processing of OS packets in the PHY and related error messages across the physical interface when the PHY is in HPI mode.

A skew control line 610 from the MAC sub-layer 602 may be used to add/subtract entries to the drift buffer, for example, instructing the buffer to add two to the read pointer, versus the nominal one. This may be used to improve the determinism or may simply be added for BIOS provision in case it is needed. The skew control line 610 can also be used for the elastic buffer. A buffer status line 612 from the PCS 604 to the MAC 602 may be added as a handshake signal to inform the MAC 602 when further delays is needed in the drift buffer for latency or determinism, for example, using the HPI protocol hardware control.

Figure 7:
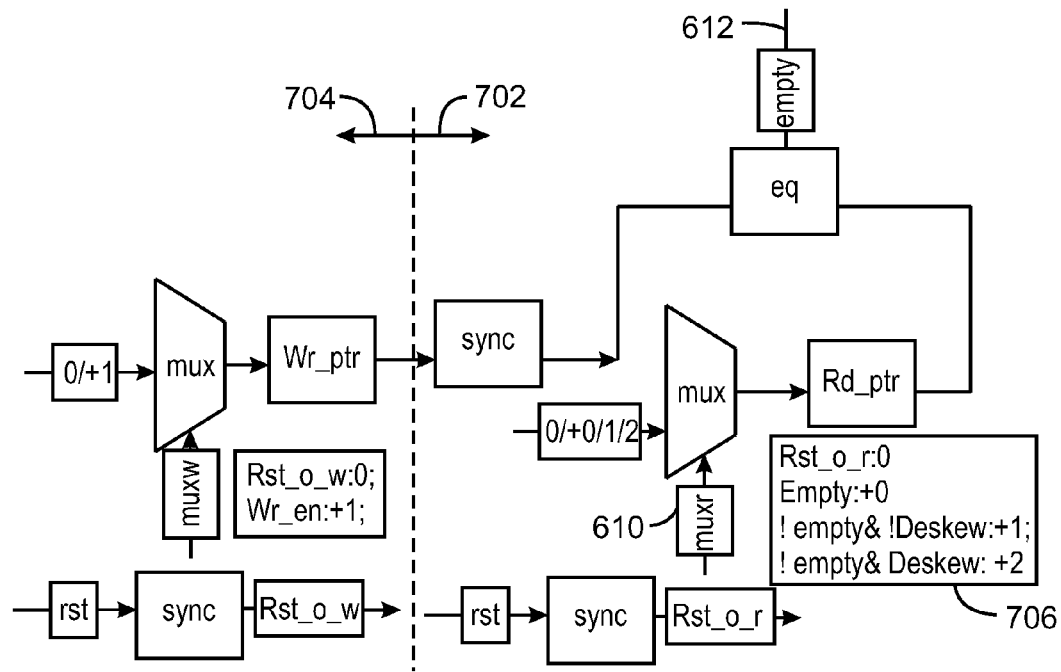
FIG. 7 illustrates a common buffer used as an elastic buffer to synchronize traffic under the PCIe protocol.

FIG. 7 illustrates a common buffer used as an elastic buffer to synchronize traffic under the PCIe protocol. Like numbered items are as described with respect to FIG. 6. As described herein, a common buffer is used for storage in both the elastic buffer as well as drift buffer modes with separate control circuitry for both for ease of implementation. The read domain is indicated by arrow 702 and the write domain is indicated by arrow 704.

Figure 8:
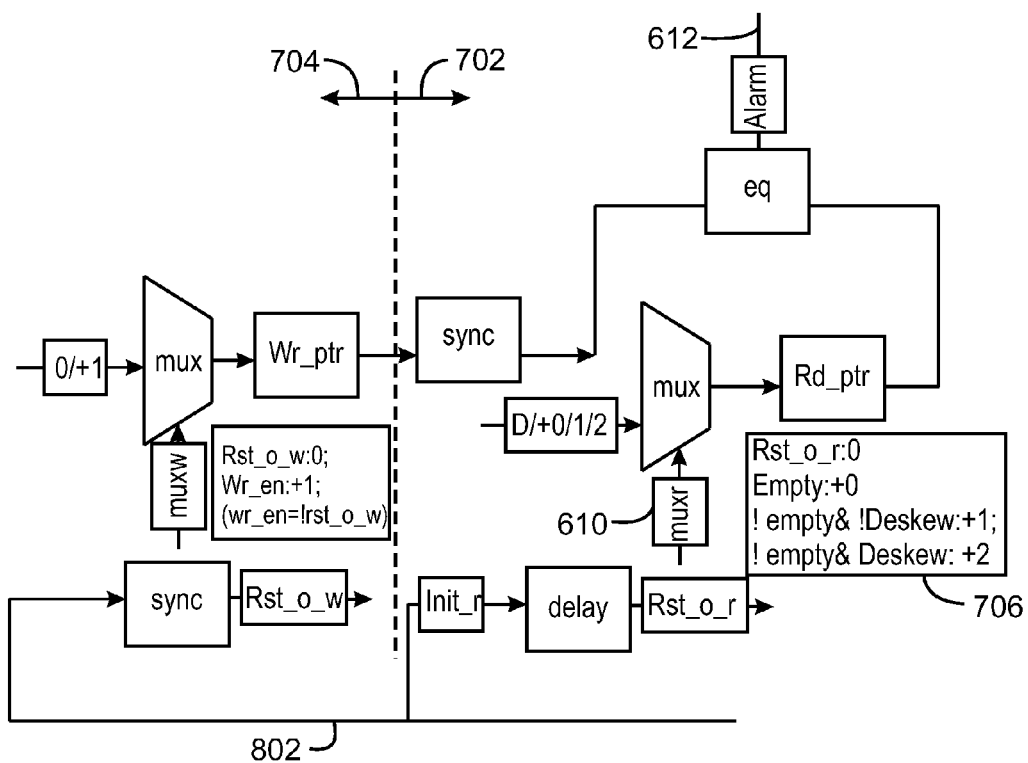
FIG. 8 illustrates a common buffer used as a drift buffer to synchronize traffic under either the HPI protocols.

FIG. 8 illustrates a common buffer used as a drift buffer to synchronize traffic under either the HPI protocols. Like numbered items are as described with respect to FIGS. 6 and 7. In an HPI protocol, a common clock line 802 is used to synchronize the write domain 704 with the read domain 702. Further, HPI usages include means to reduce the depth (e.g. incrementing read pointer by two) during L0p deskew which is needed for deterministic behavior.

Figure 9:
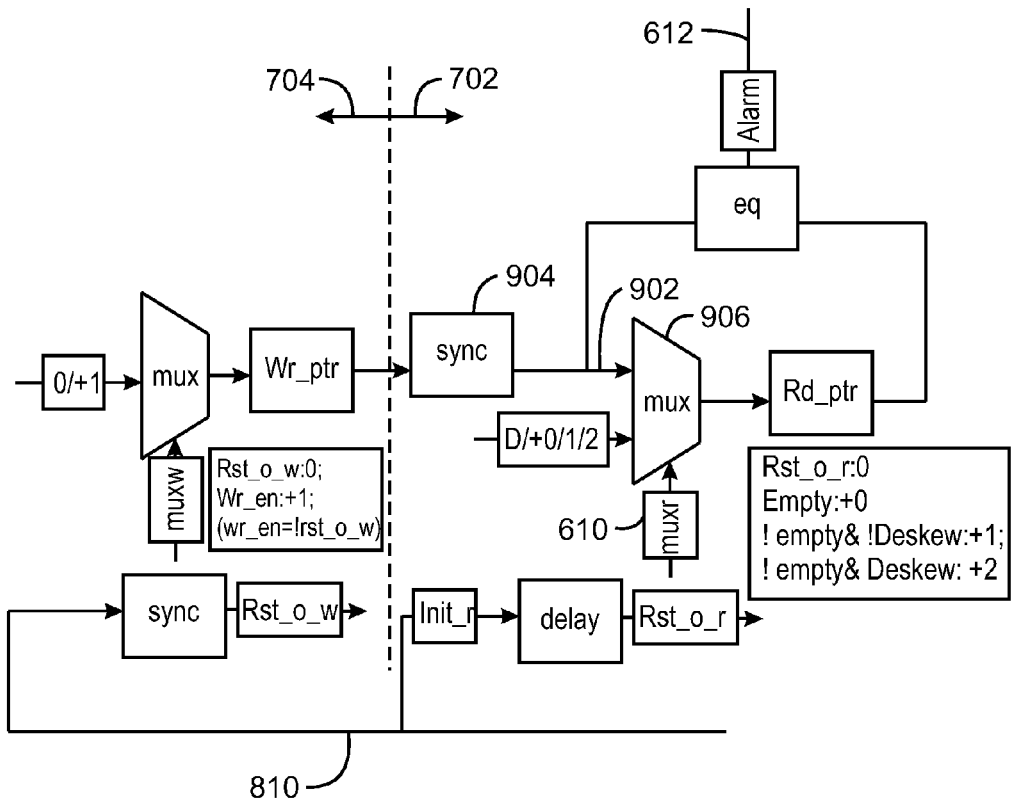
FIG. 9 illustrates a common buffer used as a minimal depth buffer with the read pointer initialized to the write pointer value after synchronization.

FIG. 9 illustrates a common buffer used as a minimal depth buffer with the read pointer initialized to the write pointer value after synchronization. Like numbered items are as described with respect to FIGS. 6, 7, and 8. In this embodiment, a sync line 902 couples the read domain 702 sync clock 904 to the multiplexer 906, providing a minimal depth buffer with read pointer initialized to the write pointer value after synchronization.

Figure 10:
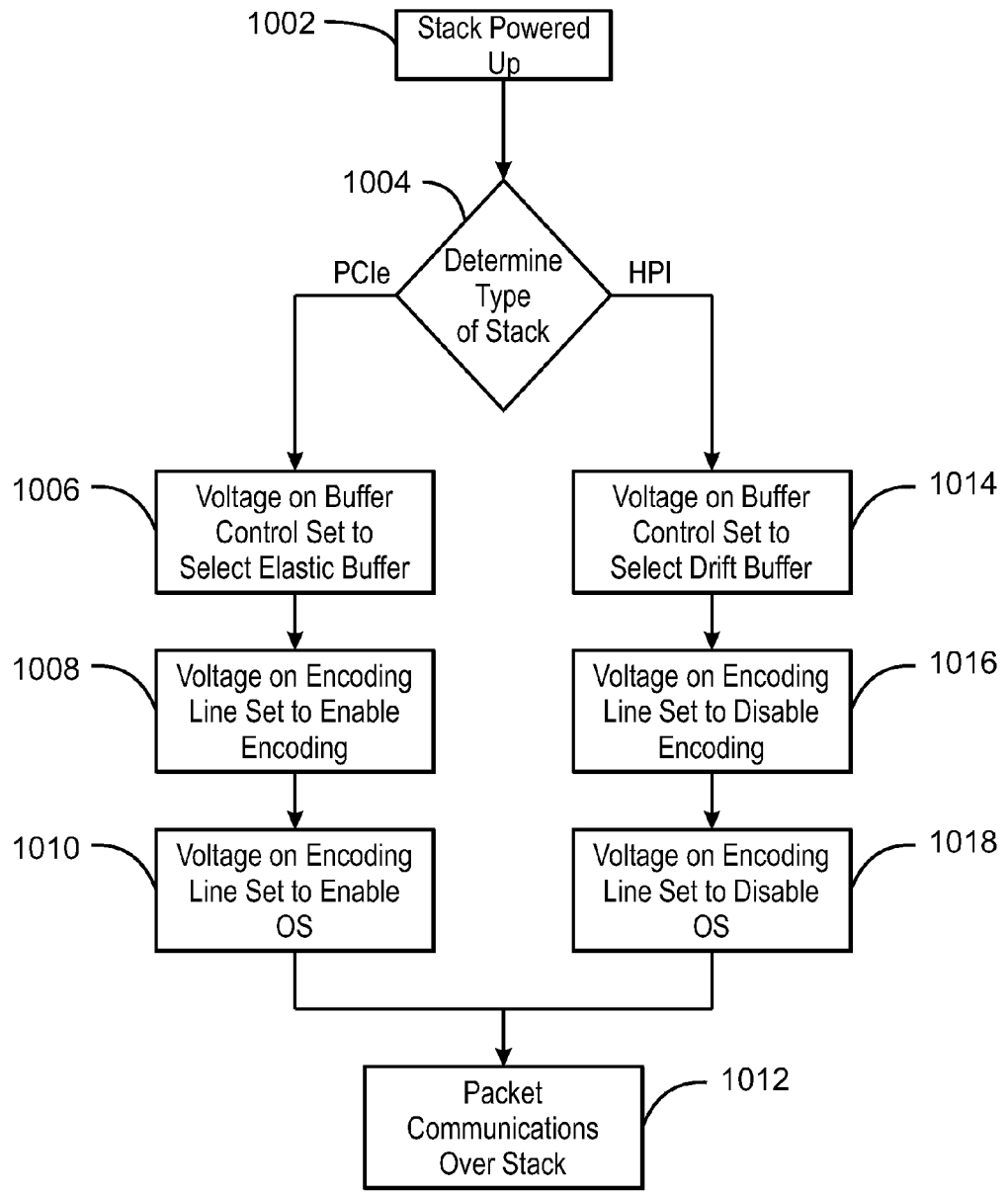
FIG. 10 is a block diagram of a method for operating a multi-protocol physical interface.

FIG. 10 is a block diagram of a method 1000 for operating a multi-protocol physical interface. The method begins at block 1002 when the system is powered up. At block 1004, the circuitry of the multi-protocol physical interface determines in which type of stack it is installed.

If it is installed in a PCIe protocol stack, the process flow goes to block 1006. At block 1006 a voltage level on a buffer control line instructs a buffer to operate as an elastic buffer. At block 1008, a voltage level is set on a first encoding line to enable 8b/10b or 128b/130b encoding. At block 1010, a voltage level is set on a second encoding line to enable an OS generator. In one embodiment, the first and second encoding lines are combined together in a single line. At block 1012, packetized communications using the PCIe protocol are conducted through the multi-protocol physical interface.

If at block 1004, the circuitry determines that the multi-protocol physical interface is part of an HPI stack, then process flow proceeds to block 1014. At block 1014 a voltage level on a buffer control line instructs a buffer to operate as a drift buffer. At block 1016, a voltage level is set on a first encoding line to disable 8b/10b or 128b/130b encoding. At block 1018, a voltage level is set on a second encoding line to disable an OS generator. In one embodiment, the first and second encoding lines are combined together in a single line. At block 1012, packetized communications using the HPI protocol are conducted through the multi-protocol physical interface.

Figure 11:
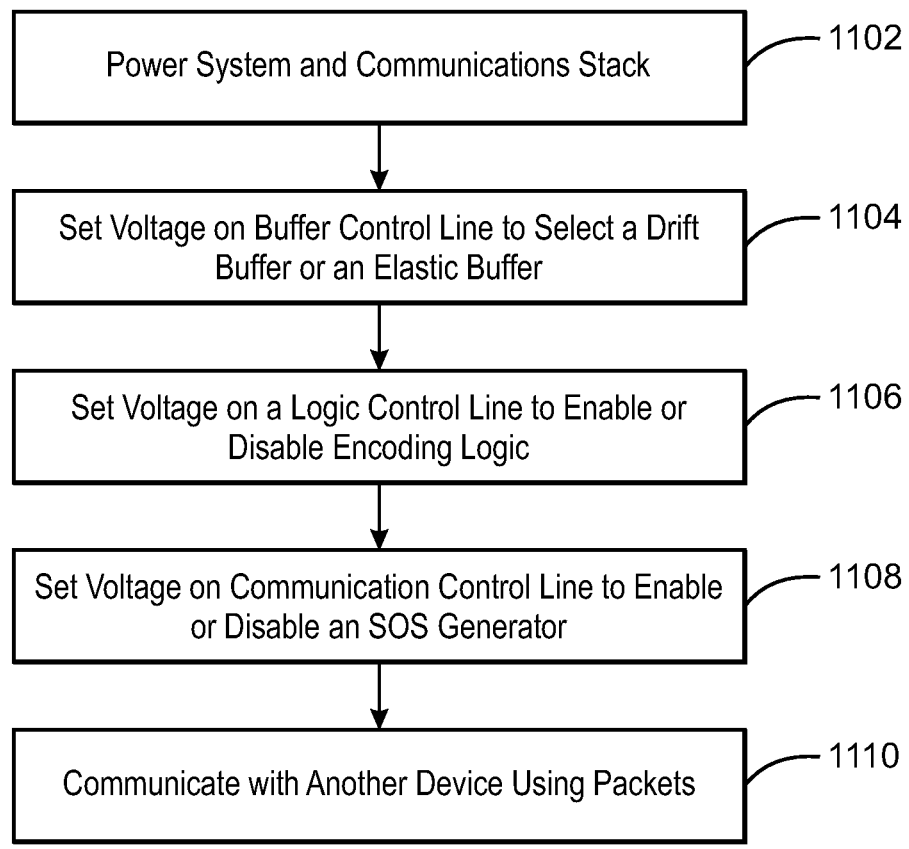
FIG. 11 is a simplified block diagram of a method for operating a multi-protocol physical interface.

FIG. 11 is a simplified block diagram of a method 1100 for operating a multi-protocol physical interface. The process starts at block 1102 with the powering on of the system and communications stack. At block 1104, a voltage level is set on a buffer control line to select a drift buffer or an elastic buffer. At block 1106, a voltage level is set on a logic control line to enable or disable encoding logic. At block 1108, a voltage level on a communications control line to enable or disable an Ordered Set (OS) generator. At block 1110, packetized communications are exchanges with other units over the multi-protocol physical interface.

Examples may include subject matter such as systems and methods that provide a physical interface for a high speed serial interconnect. The physical interface can be used in communication stacks for different protocols, including PCIe and HPI without substantial modification according to embodiments and examples described herein.

Example 1 is an apparatus that includes a physical interface for a serial interconnect. The physical interface includes a buffer that is selectable to function as a drift buffer or an elastic buffer by a voltage level on a buffer control line. The physical interface also includes encoding logic that can be enabled or disabled by a voltage level on a logic control line. Further, the physical interface also includes and an ordered set generator that can be enabled or disabled by a voltage level on a communications control line.

The physical interface may carry high performance interconnect (HPI) traffic when the buffer is selected to function in drift buffer operation. The apparatus may include encoding circuitry that can support HPI frequency increments. The physical interface may carry peripheral component interconnect express (PCIe) traffic when the encoding logic and the ordered set generator are enabled and the buffer is selected to function as an elastic buffer. Further, the apparatus includes encoding circuitry that can support PCIe frequency increments.

The physical interface may be part of an HPI protocol stack or may be part of a peripheral component interconnect express (PCIe) stack. The encoding logic may encode data as 128b/130b packets. The ordered set generator generates Ordered Set (OS) packets, and controls communications for a PCIe protocol. The apparatus may include a central processing unit (CPU) chip.

The apparatus may include a skew adjust control that increments a read pointer by 1 or by 2 depending on the voltage level of a skew control line. The apparatus may also include a separate OS selection line that enables or disables the generation of OS, wherein when the OS selection line is present the encoding control line only enables or disables the encoding logic. The physical interface may carry HPI traffic on a PCIe communications system when the encoding logic and the ordered set generator are enabled and the buffer is selected to function as an elastic buffer.

The apparatus may include an extension device. The apparatus may also include a multiprocessor computing system.

Example 2 provides a method of communicating between units in a computing system using a physical interface. The method includes setting a voltage level on a buffer control line to select a drift buffer or an elastic buffer, setting a voltage level on a logic control line to enable or disable encoding logic, and setting a voltage level on a communications control line to enable or disable an ordered set (OS) generator. The method then includes communicating with another device using packets.

The method may include setting the voltage level on the buffer control line to select the drift buffer, setting the voltage level on the logic control line to disable the encoding logic, and setting the voltage level on the communications control line to disable the OS generator. The method may also include sending high performance interconnect (HPI) traffic through the physical interface using these settings.

The method may include setting the voltage level on the buffer control line to select the elastic buffer, setting the voltage level on the logic control line to enable the encoding logic, and setting the voltage level on the communications control line to enable the OS generator, and sending peripheral component interconnect express (PCIe) traffic through the physical interface. The method may also include sending peripheral component interconnect express (PCIe) traffic through the physical interface using these settings.

The method may include setting the voltage level on the buffer control line to select the elastic buffer, setting the voltage level on the logic control line to enable the encoding logic, and setting the voltage level on the communications control line to enable the OS generator. HPI traffic may then be sent through the physical interface as PCIe traffic.

The method may include sending HPI traffic through the physical interface from an HPI protocol stack. The method may also include sending PCIe traffic through the physical interface from a PCIe protocol stack.

Example 3 includes an apparatus that includes circuits forming an HPI protocol stack for a serial interconnect. The apparatus includes a physical layer that includes a buffer that is selected to function as a drift buffer by a voltage level on a buffer control line, encoding logic that is disabled by a voltage level on a logic control line, and an ordered set generator that is disabled by a voltage level on a communications control line.

The apparatus may include an integrated circuit, in which a peripheral component interconnect express (PCIe) protocol stack has been replaced with the HPI protocol stack during a design of the integrated circuit. The integrated circuit was then built with the HPI protocol stack.

The apparatus may include a number of integrated circuits, each comprising a number of central processing unit cores, wherein at least one pair of the integrated circuits exchanges data over an HPI stack that includes the physical interface.

Example 4 includes an integrated circuit chip comprising a physical interface for a serial interconnect. The physical interface includes a media access control (MAC) to activate control lines to a physical layer (PHY) to set a voltage level on a buffer control line to select a drift buffer or an elastic buffer; set a voltage level on a logic control line to enable or disable encoding logic; and set a voltage level on a communications control line to enable or disable a Ordered Set (OS) generator. The PHY includes a buffer that is selectable to function as a drift buffer or an elastic buffer by a voltage level on a buffer control line. The PHY also includes encoding logic that can be enabled or disabled by a voltage level on a logic control line. Further, the PHY includes an ordered set generator that can be enabled or disabled by a voltage level on a communications control line.

The PHY may carry high performance interconnect (HPI) traffic when the buffer is selected to function in drift buffer operation. Further, the PHY may carry peripheral component interconnect express (PCIe) traffic when the encoding logic and the ordered set generator are enabled and the buffer is selected to function as an elastic buffer.

The integrated circuit chip may include an HPI protocol stack. The integrated circuit chip including a plurality of central processing unit cores, wherein at least one pair of the integrated circuits exchanges data over an HPI comprising the PHY.

Example 5 includes an integrated circuit chip that including a physical layer (PHY) for a serial interconnect. The PHY includes a buffer that is selectable to function as a drift buffer or an elastic buffer by a voltage level on a buffer control line, an encoding logic that can be enabled or disabled by a voltage level on an encoding control line, and an ordered set (OS) generator that can be enabled or disabled by the voltage level on the encoding control line.

The integrated circuit chip may include a media access control (MAC) layer to activate control lines to a physical layer to set a voltage level on the buffer control line to select the drift buffer or the elastic buffer, set a voltage level on the logic control line to enable or disable the encoding logic, and set a voltage level on a communications control line to enable or disable the OS generator.

When the buffer is selected to function in drift buffer operation, the PHY may carry high performance interconnect (HPI) traffic. When the encoding logic and the ordered set generator are enabled and the buffer is selected to function as an elastic buffer, the PHY is to carry peripheral component interconnect express (PCIe) traffic.

The integrated circuit chip may include an HPI protocol stack. The integrated circuit chip may also include a plurality of central processing unit cores, wherein at least one pair of the integrated circuits exchanges data over an HPI comprising the PHY.

Example 6 includes an apparatus for communicating between units in a computing system using a physical interface. The apparatus includes a means for setting a voltage level on a buffer control line to select a drift buffer or an elastic buffer, a means for setting a voltage level on a encoding control line to enable or disable encoding logic, a means for setting the voltage level on the encoding control line to enable or disable an ordered set (OS) generator, and a means for communicating with another device using packets.

The apparatus may also include a means for setting the voltage level on the buffer control line to select the drift buffer, a means for setting the voltage level on the encoding control line to disable the encoding logic, and a means for setting the voltage level on the encoding control line to disable the OS generator. Further, the apparatus may include a means for sending high performance interconnect (HPI) traffic through the physical interface.

The apparatus may include a means for setting the voltage level on the buffer control line to select the elastic buffer, a means for setting the voltage level on the encoding control line to enable the encoding logic, and a means for setting the voltage level on the encoding control line to enable the OS generator. Further, the apparatus may include a means for sending peripheral component interconnect express (PCIe) traffic through the physical interface.

The apparatus of claim 34 may include a means for setting the voltage level on the buffer control line to select the elastic buffer, a means for setting the voltage level on the encoding control line to enable the encoding logic, and a means for setting the voltage level on the encoding control line to enable the OS generator. Further, the apparatus may include a means for sending HPI traffic through the physical interface in PCIe traffic.

The apparatus may include a means for sending HPI traffic through the physical interface from an HPI protocol stack. The apparatus of claim 34 may include a means for sending PCIe traffic through the physical interface from a PCIe protocol stack.

Example 7 includes an apparatus that includes a physical interface for a serial interconnect. The physical interface includes a buffer that is selectable to function as a drift buffer or an elastic buffer by a voltage level on a buffer control line, encoding logic that can be enabled or disabled by a voltage level on a encoding control line, and an ordered set generator that can be enabled or disabled by a voltage level on the encoding control line.

The apparatus may include a media access control (MAC) layer to activate control lines to a physical layer to set a voltage level on a buffer control line to select the drift buffer or the elastic buffer, set a voltage level on a logic control line to enable or disable the encoding logic, and set a voltage level on a communications control line to enable or disable the OS generator.

The physical interface may carry high performance interconnect (HPI) traffic when the buffer is selected to function in drift buffer operation. The apparatus may include encoding circuitry that can support HPI frequency increments. The physical interface may carry peripheral component interconnect express (PCIe) traffic when the encoding logic and the ordered set generator are enabled and the buffer is selected to function as an elastic buffer. The apparatus may include encoding circuitry that can support PCIe frequency increments.

The physical interface may be part of an HPI protocol stack. The physical interface may be part of a peripheral component interconnect express (PCIe) stack.

Example 8 includes a method of communicating between units in a computing system using a physical interface. The method includes setting a voltage level on a buffer control line to select a drift buffer or an elastic buffer, setting a voltage level on a encoding control line to enable or disable encoding logic, and setting the voltage level on the encoding control line to enable or disable an ordered set (OS) generator. The method also includes communicating with another device using packets. The method may include sending HPI traffic from an HPI protocol stack through the physical interface using these settings. The method may include sending PCIe traffic through the physical interface from a PCIe protocol stack using these settings.

The method may include setting the voltage level on the buffer control line to select the drift buffer, setting the voltage level on the encoding control line to disable the encoding logic, and setting the voltage level on the encoding control line to disable the OS generator. The method may include sending HPI traffic from an HPI protocol stack through the physical interface using these settings.

The method may include setting the voltage level on the buffer control line to select the elastic buffer, setting the voltage level on the encoding control line to enable the encoding logic, and setting the voltage level on the encoding control line to enable the OS generator. The method may include sending HPI traffic from an HPI protocol stack through the physical interface using these settings. The method may include sending PCIe traffic through the physical interface from a PCIe protocol stack using these settings.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals), and the like, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising a physical interface for a serial interconnect, wherein the physical interface comprises:
    a buffer that is selectable to function as a drift buffer or an elastic buffer by a voltage level on a buffer control line;
    encoding logic that is enabled or disabled by a voltage level on a encoding control line; and
    an ordered set generator that is enabled or disabled by a voltage level on the encoding control line.

2. The apparatus of claim 1, wherein the physical interface carries high performance interconnect (HPI) traffic when the buffer is selected to function in drift buffer operation.

3. The apparatus of claim 1, comprising encoding circuitry that supports HPI frequency increments.

4. The apparatus of claim 1, wherein the physical interface carries peripheral component interconnect express (PCIe) traffic when the encoding logic and the ordered set generator are enabled and the buffer is selected to function as an elastic buffer.

5. The apparatus of claim 1, comprising encoding circuitry that supports PCIe frequency increments.

6. The apparatus of claim 1, wherein the physical interface is part of an HPI protocol stack.

7. The apparatus of claim 1, wherein the physical interface is part of a peripheral component interconnect express (PCIe) stack.

8. The apparatus of claim 1, wherein the encoding logic encodes data as 128b/130b packets.

9. The apparatus of claim 1, wherein the ordered set generator generates Ordered Set (OS) packets, and controls communications for a PCIe protocol.

10. The apparatus of claim 1, comprising a skew adjust control that increments a read pointer by 1 or by 2 depending on the voltage level of a skew control line.

11. The apparatus of claim 1, comprising an OS selection line that enables or disables the generation of an OS.

12. The apparatus of claim 1, wherein the physical interface carries HPI traffic on a PCIe communications system when the encoding logic and the ordered set generator are enabled and the buffer is selected to function as an elastic buffer.

13. The apparatus of claim 12, comprising an extension device.

14. A method of communicating between units in a computing system using a physical interface, comprising:
    setting a voltage level on a buffer control line to cause a buffer to function as a drift buffer or an elastic buffer;
    setting a voltage level on a encoding control line to enable or disable encoding logic; and
    setting the voltage level on the encoding control line to enable or disable an ordered set (OS) generator; and
    communicating with another device using packets.

15. The method of claim 14, comprising:
    setting the voltage level on the buffer control line to select the drift buffer;
    setting the voltage level on the encoding control line to disable the encoding logic; and
    setting the voltage level on the encoding control line to disable the OS generator; and
    sending high performance interconnect (HPI) traffic through the physical interface.

16. The method of claim 14, comprising:
    setting the voltage level on the buffer control line to select the elastic buffer;
    setting the voltage level on the encoding control line to enable the encoding logic; and
    setting the voltage level on the encoding control line to enable the OS generator; and
    sending peripheral component interconnect express (PCIe) traffic through the physical interface.

17. The method of claim 14, comprising:
    setting the voltage level on the buffer control line to select the elastic buffer;
    setting the voltage level on the encoding control line to enable the encoding logic; and
    setting the voltage level on the encoding control line to enable the OS generator; and
    sending HPI traffic through the physical interface in PCIe traffic.

18. The method of claim 14, comprising sending HPI traffic through the physical interface from an HPI protocol stack.

19. The method of claim 14, comprising sending PCIe traffic through the physical interface from a PCIe protocol stack.

20. An apparatus comprising circuits forming an HPI protocol stack for a serial interconnect, comprising a physical layer (PHY), wherein the PHY comprises:
a buffer that is selected to function as a drift buffer instead of an elastic buffer by a voltage level on a buffer control line;
encoding logic that is disabled by a voltage level on an encoding control line; and
an ordered set generator that is disabled by the voltage level on the encoding control line.

21. The apparatus of claim 20, comprising an integrated circuit, wherein a peripheral component interconnect express (PCIe) protocol stack has been replaced with the HPI protocol stack during a design; and the integrated circuit was built with the HPI protocol stack.

22. The apparatus of claim 20, comprising a plurality of integrated circuits each comprising a plurality of central processing unit cores, wherein at least one pair of the integrated circuits exchanges data over an HPI comprising the PHY.

23. An integrated circuit chip comprising a physical interface for a serial interconnect, wherein the physical interface comprises:
a media access control (MAC) to activate control lines to a physical layer (PHY) to
set a voltage level on a buffer control line to cause a buffer to function as a drift buffer or an elastic buffer;
set a voltage level on a logic control line to enable or disable encoding logic; and
set a voltage level on a communications control line to enable or disable a Ordered Set (OS) generator; and
the physical layer (PHY) comprises:
a buffer that is selectable to function as a drift buffer or an elastic buffer by a voltage level on a buffer control line;
encoding logic that is enabled or disabled by a voltage level on an encoding control line; and
an ordered set generator that is enabled or disabled by the voltage level on the encoding control line.

24. The integrated circuit chip of claim 23, wherein when the buffer is selected to function in drift buffer operation the PHY carries high performance interconnect (HPI) traffic.

25. The integrated circuit chip of claim 23, wherein when the encoding logic and the ordered set generator are enabled and the buffer is selected to function as an elastic buffer, the buffer carries peripheral component interconnect express (PCIe) traffic.

* * * * *